United States Patent
Amela Conesa et al.

(10) Patent No.: US 11,318,680 B2
(45) Date of Patent: May 3, 2022

(54) DETERMINING PRINT ORDERS

(71) Applicant: HEWLETT-PACKARD DEVELOPMENT COMPANY, L.P., Spring, TX (US)

(72) Inventors: Eduardo Amela Conesa, Sant Cugat del Valles (ES); Marta Blanch Pinol, Sant Cugat del Valles (ES); Diana Canto Estany, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 196 days.

(21) Appl. No.: 16/477,871

(22) PCT Filed: Apr. 24, 2017

(86) PCT No.: PCT/US2017/029096
§ 371 (c)(1),
(2) Date: Jul. 12, 2019

(87) PCT Pub. No.: WO2018/199884
PCT Pub. Date: Nov. 1, 2018

(65) Prior Publication Data
US 2019/0366645 A1      Dec. 5, 2019

(51) Int. Cl.
*B29C 64/393* (2017.01)
*B33Y 30/00* (2015.01)
*B33Y 50/02* (2015.01)
*B29C 64/209* (2017.01)
*B41J 2/21* (2006.01)

(52) U.S. Cl.
CPC .......... *B29C 64/393* (2017.08); *B29C 64/209* (2017.08); *B33Y 30/00* (2014.12); *B33Y 50/02* (2014.12); *B41J 2/2135* (2013.01)

(58) Field of Classification Search
None
See application file for complete search history.

(56) References Cited

U.S. PATENT DOCUMENTS

| | | | |
|---|---|---|---|
| 6,257,690 B1 | 7/2001 | Holstun | |
| 6,350,004 B1 * | 2/2002 | Askren | B41J 2/04505 347/14 |
| 6,478,396 B1 | 11/2002 | Schloeman et al. | |
| 7,252,360 B2 | 8/2007 | Hersch et al. | |

(Continued)

FOREIGN PATENT DOCUMENTS

| EP | 2008823 B1 | 8/2015 |
|---|---|---|
| WO | WO-2000006386 A2 | 2/2000 |

OTHER PUBLICATIONS

Bruijnen, D.; "Active Printhead Alignment for Wide Format Printing Systems"; Jul. 9-13, 2007; http://ieeexplore.ieee.org/document/4282241/.

*Primary Examiner* — Philip C Tucker
*Assistant Examiner* — Evan T Hulting
(74) *Attorney, Agent, or Firm* — HP Inc. Patent Department

(57) ABSTRACT

A method is described in which a sequence of print orders is determined. The sequence is to be associated to print elements to be generated by ejecting printing material from nozzles. The method comprises controlling the generation of the print elements by ejecting printing material from the nozzles according to the determined sequence.

20 Claims, 11 Drawing Sheets

(56) References Cited

U.S. PATENT DOCUMENTS

| | | |
|---|---|---|
| 8,123,318 B2 | 2/2012 | Walmsley et al. |
| 9,566,799 B1 | 2/2017 | Barkley et al. |
| 2002/0113835 A1 | 8/2002 | Pan et al. |
| 2005/0083364 A1 | 4/2005 | Billow |
| 2009/0002728 A1* | 1/2009 | Umezawa ............ B41J 2/04543 358/1.8 |
| 2014/0225952 A1* | 8/2014 | Conesa ................. B41J 2/2132 347/14 |
| 2016/0303851 A1 | 10/2016 | Shepherd |
| 2017/0348978 A1* | 12/2017 | Van Garsse ............. B41M 5/00 |

* cited by examiner

DETERMINING PRINT ORDERS

BACKGROUND

A printer may comprise a printhead with a plurality of nozzles. A two-dimension (2D) printer may eject printing material (e.g., print fluid, such as ink) on a substrate (e.g., paper). A three-dimension (3D) printer may eject printing material (e.g., build material, print fluid, or a combination thereof) on a substrate (e.g., a bed of build material). Each nozzle may eject printing material, which is directed to the substrate to generate, for example, a dot. Printing materials may be ejected from different nozzles at different instants, while a relative motion between the printhead and the substrate is performed. An order for ejecting different drops at different instants may therefore be defined.

DESCRIPTION OF THE FIGURES

FIG. 3(*b*) shows an example of real print pattern with fixed printing order.

FIG. 3(*c*) shows an example of real print pattern with printing order which is sequentially modified for generating different print elements.

FIG. 4(*b*) shows an example of a line printed using a printing order which is sequentially modified for generating different print elements.

DETAILED DESCRIPTION

Figure 1:
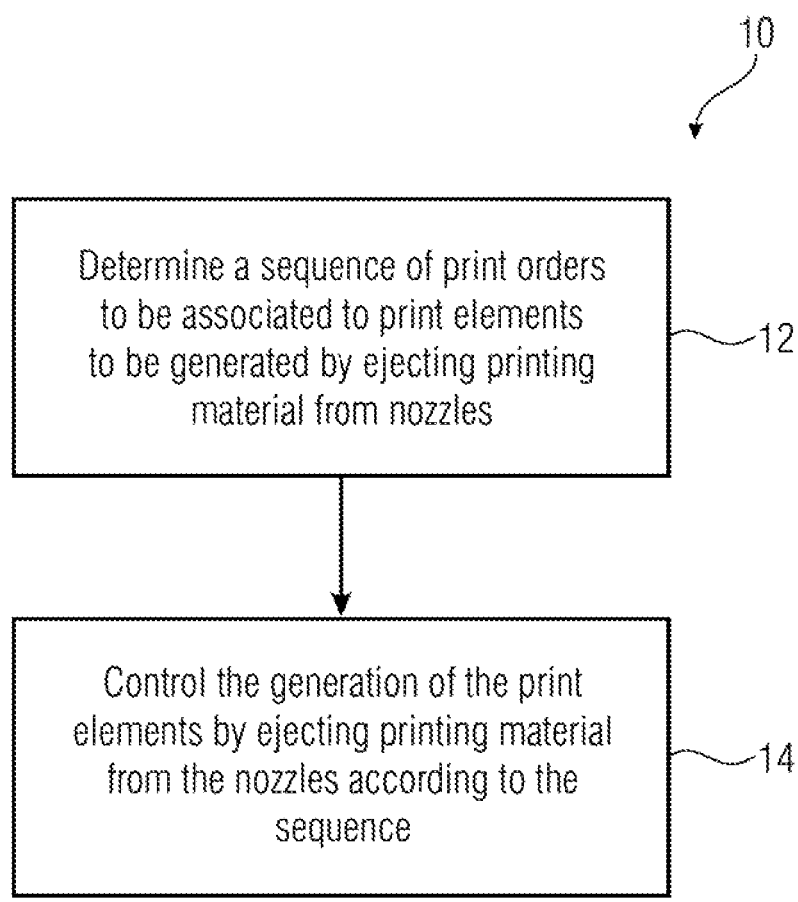
FIG. 1 is a schematic diagram showing a method according to an example.

A printer may be a two-dimension (2D) printer. A printer may be an inkjet printer, such as a thermal inkjet (TIJ) printer. A printer may be a three-dimension (3D) printer, which prints on a bed of build material. A printer (e.g., a 2D printer or a 3D printer) may apply printing material on a substrate. Printing material may comprise, for example, ink, varnish, grain, spray, printing fluid, or other material. In particular for a 3D printer, the printing material may also comprise, for example, build material, printing fluid, or a combination thereof. A printer (e.g., a 2D printer or a 30 printer) may comprise a printhead to eject drops of printing material from a nozzle to the substrate. In general, a substrate may comprise, for example, paper, plastic, a bed of build material, a combination of these materials, or another material.

In some printers, such as inkjet printers, a nozzle may comprise an orifice placed in correspondence with a chamber containing printing fluid (such as ink). In some printers (e.g., TIJ printers), a nozzle may be associated, for example, to a firing resistor, which in turn may be controlled by a switch (e.g., a transistor, such as a field effect, FET, transistor). When the resistor is energized (e.g., when the switch permits current to flow in the resistor), the temperature increases and printing fluid may vaporize, to be ejected from the nozzle towards the substrate.

While printing, a relative motion between the printhead and the substrate may be performed. For example, the printhead may be moving (e.g., over the substrate) along a swath (e.g., in a horizontal scanning direction, such as from the right to the left or vice versa), while the substrate does not move.

In the relative motion, the printhead may eject printing material to generate print elements. A print element may be or comprise, for example, a dot or a group of dots. Each dot may be generated by a single nozzle ejecting one element (e.g., a drop) of printing material. In some examples, a dot may be directed towards a position in the substrate which is different from the position of any other dot. In some examples, a dot may be an element which may be (or may be approximated to) a geometrical figure having a diameter of $1/600^{th}$ of inch (0.001667", 42.333 µm). A print element may comprise, for example, a pixel, a group of pixels, or a portion of a pixel. A pixel may be a group of dots placed, for example, so close to each other to give, to human eye, the impression of a continuous printed element. Each pixel may have a position in the substrate which is different from the position of any other pixel. At a pixel resolution, different dots constituting the same pixel may be seen as sharing the same position. At a subpixel resolution (e.g., dot resolution), different dots constituting the same pixel may be at different positions. At a subpixel resolution, a pixel may take an area (e.g. square, rectangular area) which may be imagined as a matrix in which, in correspondence to some entries, dots are present. At a subpixel resolution, a pixel may have two dimensions which are multiples of basic lengths (each basic length may be the same or correspond to a dot diameter). For example, a pixel may be (or may be approximated to) a square of a dimension of 4×4 dots, i.e., for example, $4/600^{th}$ of inch×$4/600^{th}$ of inch (0.006667"×0.006667", 169.333 µm×169.333 µm. A print element may comprise, for example, a group of pixels which are to be printed concurrently. A print element may comprise, for example, a line of pixels (e.g., a vertical line, orthogonal to a horizontal direction of a swath).

In a relative motion between the printhead and the substrate, different dots may be generated by ejecting printing material elements (e.g., fluid drops) at different instants. For example, a logic unit may associate the position (at subpixel resolution) of the printhead with respect to the substrate to the dots which are to be fired at each time instant. Therefore, a logic unit may be responsible, at any instant, of determining the nozzles from which printing material is to be ejected. The logic unit may define an order of dots to be generated, at subsequent time slots. By reaching the substrate at intended positions even though at different time instants, the plurality of dots may define a pixel or a line of pixels, giving the impression of a continuous printed element.

FIG. 1 shows a method 10 according to an example. At block 12, a sequence of print orders (print order sequence) is determined. Each order is to be associated to a print element to be generated by ejecting printing material from a plurality of nozzles. For example, a first print order may define the sequential order according to which printing material elements (e.g., fluid drops, ink drops) are to be ejected from different nozzles at different time slots (in some TIJ printers, by defining the chronological order of the resistors to be energized in correspondence with different positions of the printhead over the substrate). The first print order may be associated, for example, to dots to be placed on a specific position in the substrate (e.g., a columnar area). A first print element may be a group of dots to be printed, for example, as a group of vertical pixels. The print order sequence may define a second print order to be used subsequently, e.g., for generating a second print element, such as a second group of dots to be placed on an area (e.g., a columnar area) adjacent to the area of the first print element. The second print order may be different from the first print order. The print order sequence may define a plurality of print orders to be used to generate consecutive print elements. The sequence may be periodic. After having generated print elements according to the last order of the print order sequence, the subsequent print order of the sequence be the first print order.

The determination may be based, for example, on measurements. The measurements may permit the determination of visual data associated to different test patches printed according to different print order sequences. Quality-related data may be obtained for different test patches. Quality-related data may be ordered according to criteria such as the optical density measured for each test patch, the presence of printed elements detached from the rest of printed portions (satellites), the presence of holes inside printed portions, the measured thickness of areas of text test patches, and so on. Therefore, it is possible to select a print order sequence associated to a high-ranked test patch. For example, the print order sequence that, in operation, is to be used may be the print order sequence associated to the test patch which has the highest ranking in terms of number of satellites or holes, thickness or area, optical density, or a combination of these criteria.

At block 14, a control of the generation of each print element may be performed. Therefore, dots and print elements are generated on the substrate. For example, in a relative motion between the printhead and the substrate, dots may be generated at consecutive (e.g., immediately subsequent) time slots on consecutive (e.g., adjacent) areas on the substrate according to print orders that change on the basis of the print order sequence.

The method may permit to better tolerate irregular spacings between the nozzles. By using print orders that change for generating consecutive print elements, the occurrence of repeating imprecise dot positions on the substrate is reduced.

Further, it is more difficult that errors are cumulated. In case of misalignment of a nozzle, e.g., of $0.5/600^{th}$ of an inch (0.000833", 21.1667 µm), a misalignment error is cumulated to be $1/600^{th}$ (0.001667", 42.333 µm), $1.5/600^{th}$ (0.0025", 63.5 µm) and so on at different increments. However, by defining different orders for adjacent print elements (e.g., pixels) the misalignment error is not cumulated.

The method may also cope with irregularities which are not due to the nozzle spacing. For example, the method may permit to better tolerate errors which are due to non-perfect synchronization of the printhead firing control with the control of the speed of the relative motion between the printhead and the substrate.

The method may also permit to better tolerate dot irregularities which are due to delays in ejecting the printing material (e.g., in some TIJ printers, delays in energizing the resistors).

The method may permit to tolerate errors which are due to imprecise determination or estimation of the distance between the substrate and the printhead: with a bad positioning, the trajectory of the ejected printing material elements reaches unintended positions of the substrate. However, by choosing an appropriate print order, the printing material fired from the nozzle may arrive at the correct position on the substrate.

Figure 2:
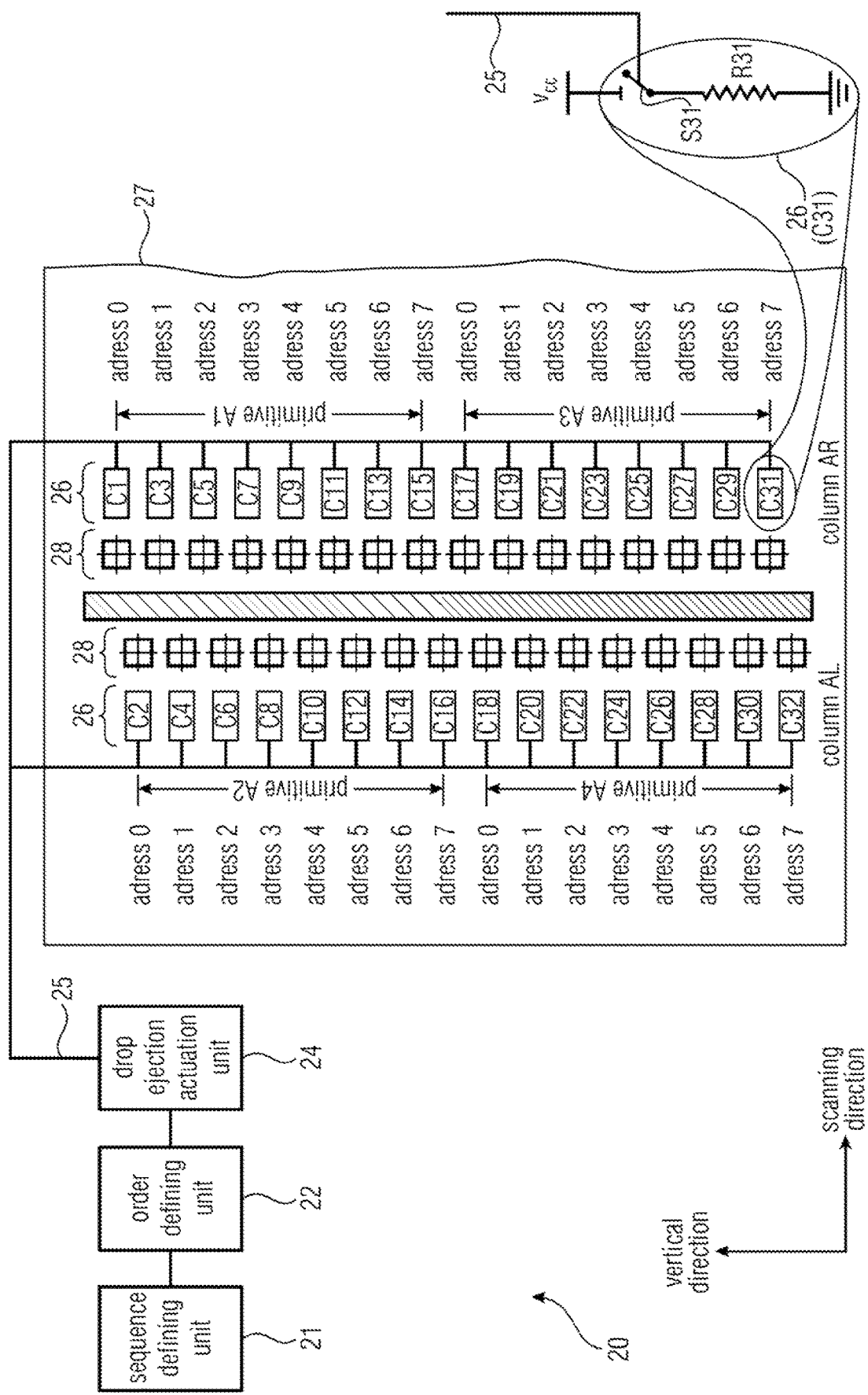
FIG. 2 is a schematic diagram showing a system according to an example.

FIG. 2 shows a system 20. The system 20 may perform the method 10, for example. The system 20 may comprise a printhead die 27, which may be in relative motion with respect to the substrate.

The system 20 may comprise a drop ejection actuation unit 24. At any instant, the drop ejection actuation unit 24 may provide a signal or a plurality of signals at an output line 25 to each of a plurality of nozzle circuitries 26 (Indicated with C0-C31), each associated to a nozzle. Each nozzle circuitry may comprise (e.g., in a TIJ printer) a resistor (e.g., R31) and a switch (e.g., S31) which may be, for example, a FET transistor. The switch may control the status of the resistor (e.g., by closing a circuit between a positive voltage Vcc and a ground voltage). Each resistor may be inserted in a chamber and may be associated to one of the nozzles 28. A drop may be selectively forced to be ejected from the nozzle associated to the resistor.

The output line 25 of the drop ejection actuation unit 24 may comprise, for example, a plurality of conductor lines, each associated to one or more nozzle circuitries 26. For example, the conductor lines of the output line 25 may control the switches (e.g., connected to the gate of the FETs), such as S31.

The nozzles 28 may be organized according to a spatial layout. The spatial layout may provide, for example, a plurality of nozzles placed in a column (e.g., a column which is vertical as compared to the horizontal scanning direction). The spatial layout may provide, for example, two columns of nozzles horizontally spaced from each other. For example, in FIG. 2, two parallel columns AL and AR are present. In some examples, the distance between two columns may correspond to one pixel. In some examples, the distance between two columns may correspond to an integer number of dots (e.g., a multiple of the diameter of one dot), e.g., four or five dots. In some examples, the distance between two columns may correspond to 4 dots. In some examples, the distance between two columns may correspond to $4/600^{th}$ of inch (0.006667", 169.333 µm)) or $5/600^{th}$ of inch (0.008333", 211.667 µm).

According to the spatial layout, the nozzles 28 may be staggered in the horizontal scanning direction. In some examples, nozzles 28 of adjacent columns are not in the same horizontal line. For example, the vertical coordinate of nozzles of the column AL is not the same vertical coordinate of nozzles of the column AR. In some examples, between the vertical coordinates of two consecutive nozzles in the same column, in another column there is always a nozzle whose vertical coordinate is intermediate. The distance between two consecutive nozzles in the same column may be one dot.

During printing operations, the nozzles 28 are, together with the printhead die 27, in relative motion with respect to the substrate. In FIG. 2, for example, the printhead die 27 may move in the scanning direction (here, horizontal) from the left to the right (or vice versa).

The nozzles 28 may be subdivided into primitives (e.g., A1, A2, A3, A4). In one example, a primitive may have a vertical extension. For example, a column may be divided into primitives. For example, each primitive may have a number of nozzles which is multiple of 2 (e.g., 8 nozzles). Each primitive may be defined so as, at any given instant, a drop is ejected from a limited number of nozzles (e.g., one single nozzle or two single nozzles). For example, a single power lead may provide power to all the nozzle circuitries 26 (in particular, the resistors) of each primitive. For example, in each primitive, all the FETs may have drains and sources connected together: one single gate at any time may be selected for the primitive. Accordingly, it is possible to limit the current associated to each primitive.

The nozzles 28 (and the corresponding nozzle circuitries, resistors, etc.) may be associated to a plurality of addresses (e.g., address0-address7 In FIG. 2). In some examples, in a primitive each nozzle is associated to a different address. Each address may be associated to a plurality of nozzles (e.g., one single nozzle for each primitive). Nozzles in the same position in different primitives (e.g., all the primitives of the same column) may share the same address. For example, for all the primitives of the same column, the first nozzles (from above in the vertical direction) may be associated to the same address (e.g., address0). For all the primitives of the same column, the second nozzles (from above in the vertical direction) may be associated to the same address (e.g., address1), and so on. In other examples, nozzles at different positions in the same primitive may correspond to the same address. All the nozzles at the same address in different primitives of the same column may operate to eject printing material at the same time. All the resistors associated to the same addresses may be energized at the same time, for example. In the case of using FETs for energizing the resistors, the gates of the FETs associated to the same addresses may be connected together (e.g., to the same physical conductor of the output line 25): these gates may be activated/deactivated at the same time on the basis of the output provided by the drop ejection actuation unit 24.

In examples, the drop ejection actuation unit 24 may provide an output indicating, at each instant, from which nozzles (corresponding to which address) a drop is to be ejected (e.g., which resistor is to be energized).

For example, the drop ejection actuation unit 24 may comprise circuitry or a combination of circuitry and non-transitory memory elements storing executable instructions. The drop ejection actuation unit 24 may comprise a plurality of output ports, each output port being connected to an conductor line of the output line 25. Each output line may be connected to a plurality of nozzle circuitries 26, such as a plurality of nozzle circuitries 26 associated to the same address. In order to control the conductor lines, the drop ejection actuation unit 24 may comprise a plurality of combinatorial elements (e.g., logic ports, switches, latches) which, at each instant, control the logic status of each conductor line, e.g., to control the energization of the firing resistors. The drop ejection actuation unit 24 may comprise a decoder which selects an output port on the basis of an encoded data obtained as an input.

The system 20 may comprise an order defining unit 22, to be use, for example, for the generation of a print element. The order defining unit 22 may define a print order according to which drops are to be ejected from the nozzles. The order defining unit 22 may define, for example, a chronologic order of addresses to be activated. For example, the order defining unit 22 may control address0 to be activated before address1, which may be activated before address2, and so on.

For example, the order defining unit 22 may comprise circuitry or a combination of circuitry and non-transitory memory elements storing executable instructions. The order defining unit 22 may control, at each instant, the drop ejection actuation unit 24. The order defining unit 22 may comprise storage elements in which the order of nozzles from which print material is to be ejected is stored. The storage elements may store a plurality of orders. The order defining unit 22 may comprise a synchronizing element (e.g., based on a clock element) which synchronizes the output of the order defining unit 22 and the operations of the drop ejection actuation unit 24. At any time synchronization, the output of the order defining unit 22 may be updated to control the order defining unit 22 to energize different resistors. The update of the output of the order defining unit 22 may be based on the order as stored in the storage elements. In some examples, the output of the order defining unit 22 may comprise encoded data which is decoded by the drop ejection actuation unit 24.

The system 20 may comprise a sequence defining unit 21. The sequence defining unit 21 may define a sequence of print orders. For example the sequence defining unit 21 may instruct the order defining unit 22 to perform a control to define, at first, a first print order and, subsequently, a second print order.

For example, the sequence defining unit 21 may comprise circuitry or a combination of circuitry and non-transitory memory elements storing executable instructions. The sequence defining unit 21 may control the order defining unit 22 to use, at any instant, a particular order for controlling the nozzle ejections.

The sequence defining unit 21 may comprise storage elements in which the different orders are stored. The sequence defining unit 21 may comprise storage elements in which different sequences are stored. Each sequence may be composed of a plurality of orders, to be used sequentially for generating adjacent print elements. When the sequence defining unit 21 select a particular sequence, the order defining unit 22 forces the drop ejection actuation unit 24 to control the circuitries according to the selected sequence. In operation, after that the sequence defining unit has chosen a sequence, the order defining unit may continue requesting the ejections according to that sequence.

During a configuration session (e.g., at block 12), the sequence defining unit 21 may control the generation of different test patches according to different sequences of orders. On the basis of visual data associated to the different patches printed according to different sequences, the sequence defining unit 21 may define the sequence of orders to be used in operation (to generate print jobs).

FIG. 3(*a*) shows an ideal print pattern 30*a* of a vertical line with a length of four pixels and a thickness of two pixels. At a pixel resolution, the pattern 30*a* may be seen as being constituted by two vertical lines, each comprising four consecutive pixels (or four horizontal lines, each comprising two adjacent pixels). At a subpixel resolution, the pattern 30*a* may be seen as having a plurality of dots positioned within the areas defined for each pixel. For example, a pixel area may be constituted by four vertical basic lengths times four horizontal basic lengths. A pixel area may be constituted by 16 subpixel areas. In FIG. 3(*a*), each dot ideally corresponds to one of these 16 subpixel areas. According to this pattern 30*a*, ideally four dots are placed within each pixel area. Ideally, each nozzle may eject a drop which exactly hits the substrate in correspondence of an intended subpixel area. FIG. 3(*a*) shows the correspondence of numbered nozzles 1 . . . 16 with horizontal lines of subpixel areas. In this example, the dots represented with void circles are generated by drops ejected from nozzles in a left column (odd-numbered nozzles), while the dots represented with filled circles are generated by drops ejected from nozzles in a right column (odd-numbered nozzles).

The dots are not printed simultaneously, but according to an order defined by the order defining unit 22, during the relative motion between the printhead die and the substrate. The distance between the dots 35 and 35' and the distance between the dots 31 and 31' may be ideally 4/600$^{th}$ of inch (0.00666", 169.333 μm) or. For example, the nozzle no. 2 ejects a drop which generates the dot 31 before ejecting the drop which generates the dot 31'. Further, the nozzle no. 10 ejects a drop which generates the dot 32 before that the nozzle no. 8 ejects a drop which generates the dot 32'. In turn, the dot 32' is generated before the dot 32'', and so on. Hence, when generating the dots of the first vertical line of pixels (first print element), an order is defined, according to which the nozzle 10 precedes the nozzle 8, which precedes the nozzle 6, which precedes the nozzle 4. As shown by the positions of dots 33, 33', 33', the same order is repeated for generating the dots of the second vertical line of pixels (second print element).

Figure 3A:
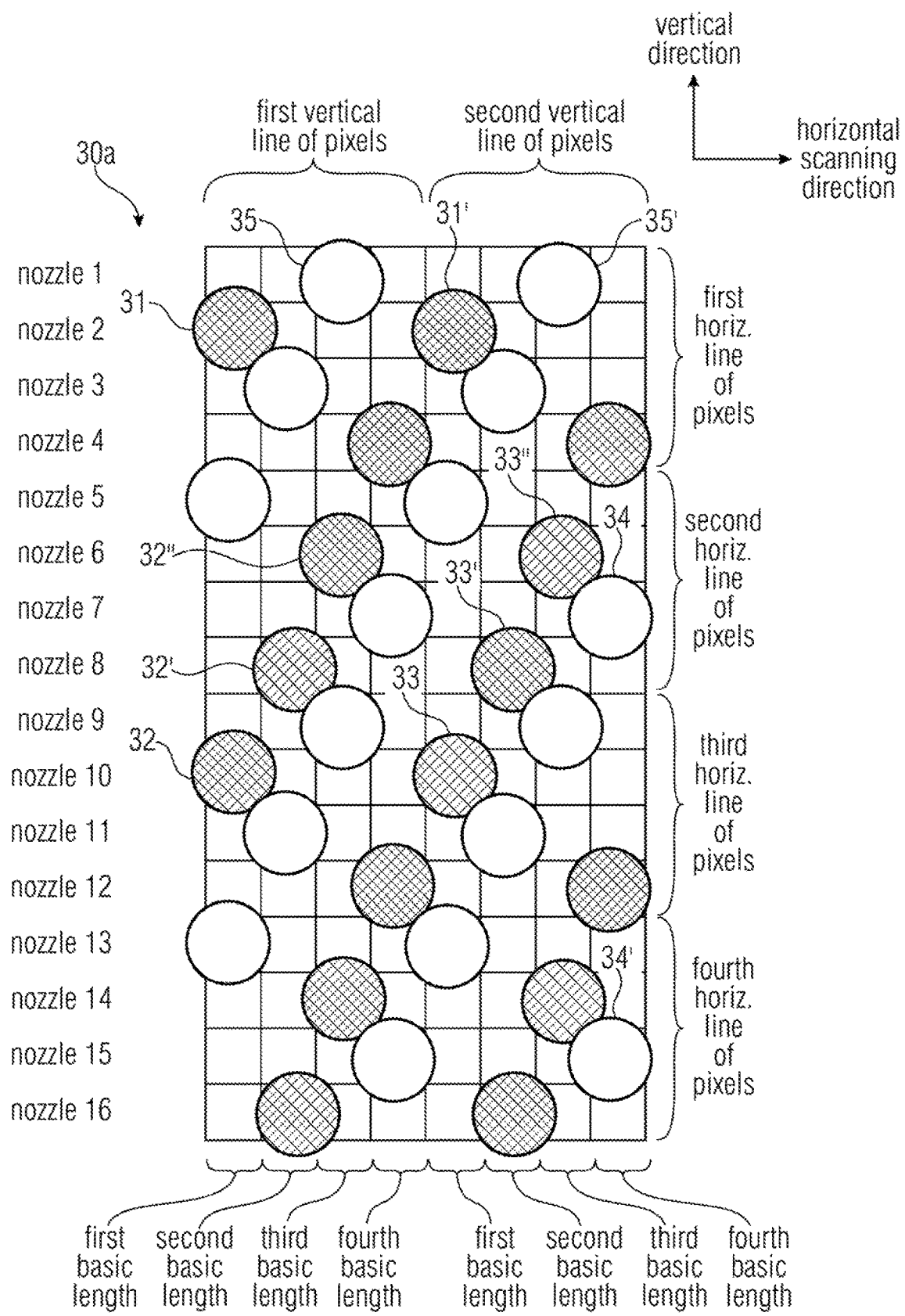
FIG. 3(*a*) shows an example of ideal print pattern.
Figure 3B:
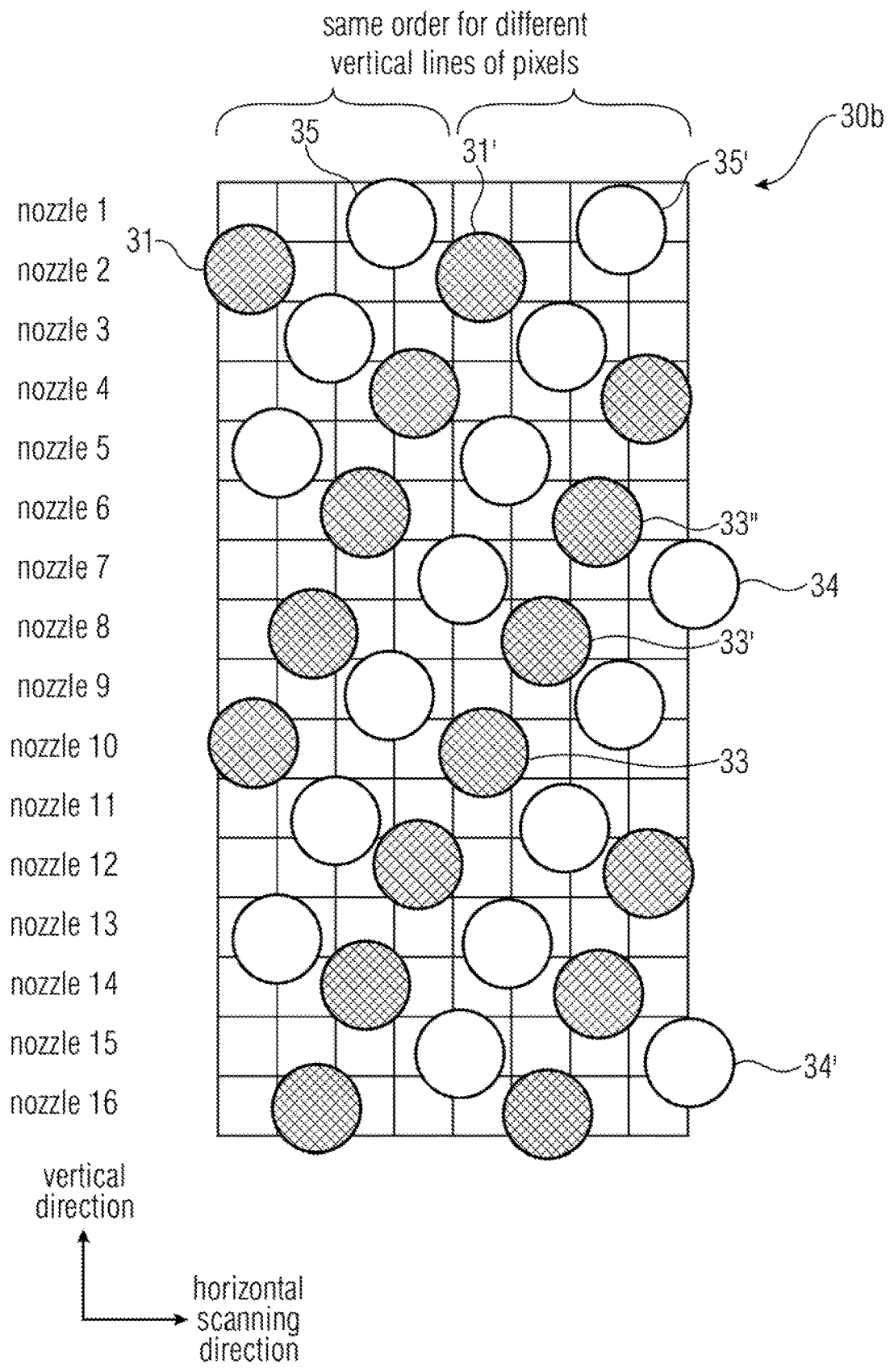

A real version of pattern 30a is referred to with 30b in FIG. 3(b). In this case, in view of misalignment or other defects, the real spacing between the repeated dots generated by the nozzles in the right column (column AR, odd-numbered nozzles) is, incorrectly, 4.5/600$^{th}$ of inch (0.0075", 190.5 μm), while the real spacing between the repeated dots generated by the nozzles in the left column (column AL, even-numbered nozzles) is, correctly, 4/600$^{th}$ of inch (0.006667", 169.333 μm). It is possible to see that some dots are not generated at the intended position. This occurrence may cause visible defects. For example, the dots 34 and 34' may be so distant from the other dots that they may appear, to human eye, as detached from the other portions of the pattern 30b (satellites). Human eye is capable of noticing the presence of an incorrect spacing of 0.5/600$^{th}$ of an inch (0.000833", 21.1582 μm). Further, the pattern 30b may be impaired by visible holes. Moreover, the dots 34 and 34' cause the vertical line to be jagged. Further, the jaggedness of the line is more noticeable in view of the fact that these defects are repeated periodically.

Figure 3C:
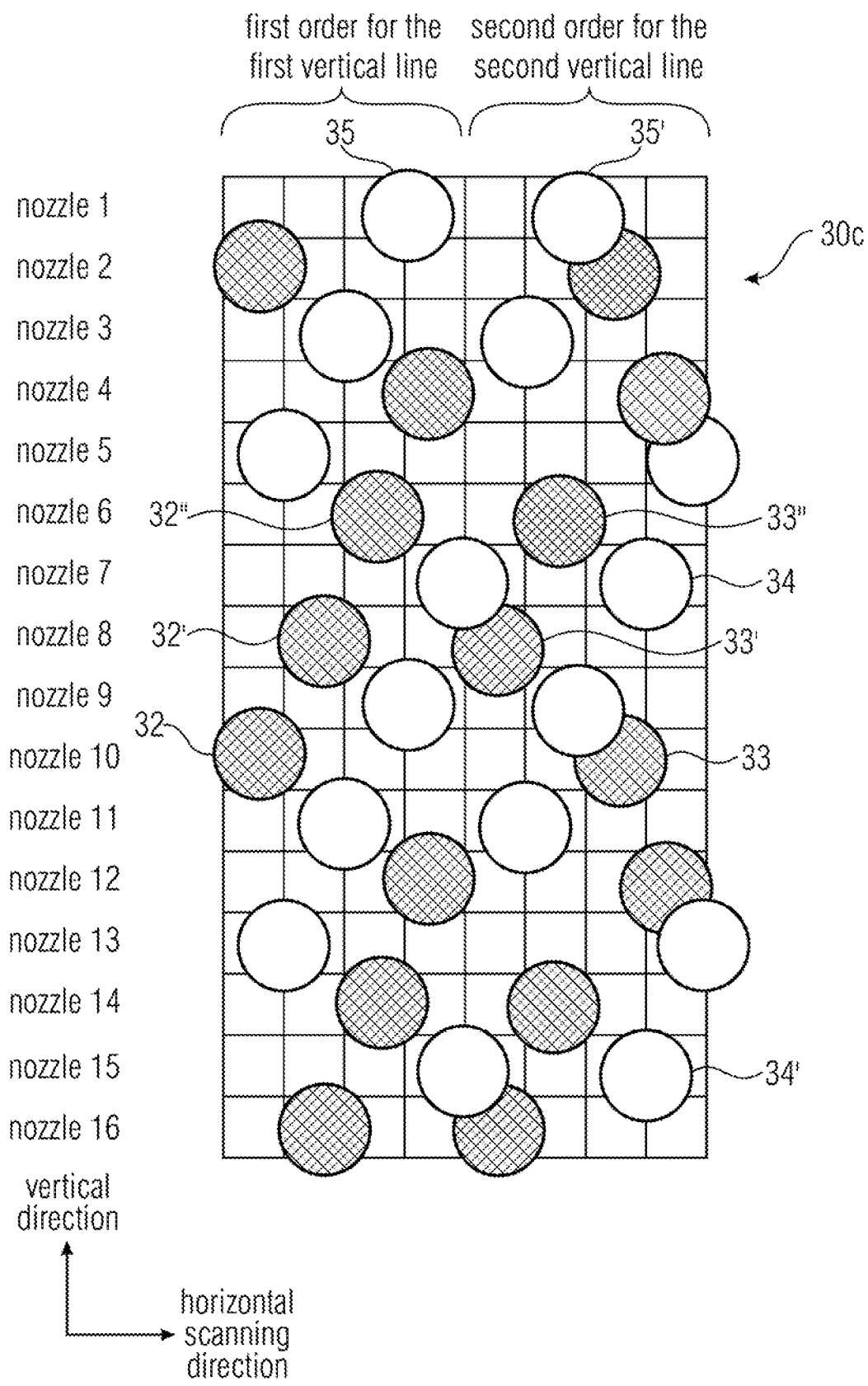

FIG. 3(c) shows a pattern obtained by a non-ideal layout as in FIG. 3(b). Also in FIG. 3(c), the real spacing between the repeated dots generated by the nozzles in the right column (column AR, odd-numbered nozzles) is, incorrectly, 4.5/600$^{th}$ of inch (0.0075", 190.5 μm), while the real spacing between the repeated dots generated by the nozzles in the left column (column AL, even-numbered nozzles) is, correctly, 4/600$^{th}$ of inch (0.006667", 169.333 μm). However, in FIG. 3(c) the pattern 30c is obtained by changing the print orders, e.g., using the method 10.

As can be seen from the position of dots 32, 32', 32'', for the first vertical line of pixels (first print element), the order is the same as in FIGS. 3(a) and 3(b). However, for the second vertical line of pixels (second print element), a different order is used: the dot 33' is generated by the nozzle 8 before the dot 33', which in turn is generated (by the nozzle 6) before the dot 33 (generated by the nozzle 10). Hence, while for generating the first vertical line of pixels a first order is used, for generating the second vertical line of pixels a second, different order is used. Notably, the dots 34 and 34' are not positioned particularly distant from their intended position and from the other dots forming the pattern. Accordingly, the number of satellites may be reduced. Analogously, the quantity of holes within the pattern 30c is also reduced. Moreover, periodicity and accumulation of misplacement errors are also reduced. The vertical line represented by the pattern 30c appears less jagged to human eye.

Figure 4A:
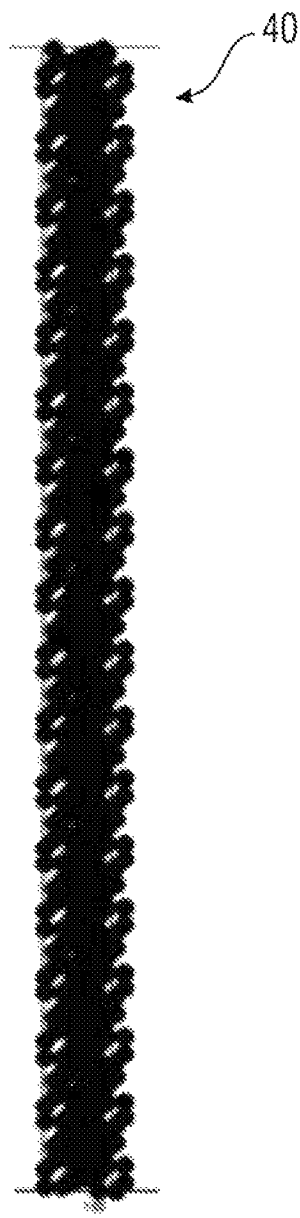
FIG. 4(*a*) shows an example of a line printed using a fixed printing order.
Figure 4B:
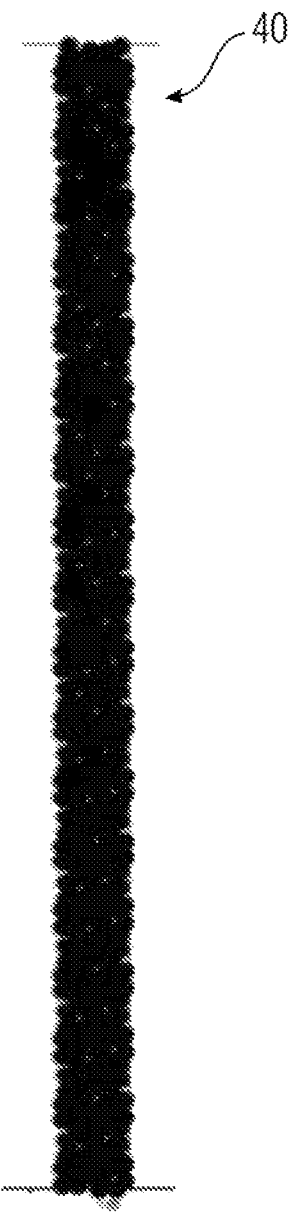

FIG. 4(a) shows a line 40' printed without changing the orders of the nozzle ejections. A jagged profile and holes in the line are evident. FIG. 4(b) shows a line 40' printed according to method 10. The jaggedness of the profile and the presence of holes are extremely reduced.

Figure 5:
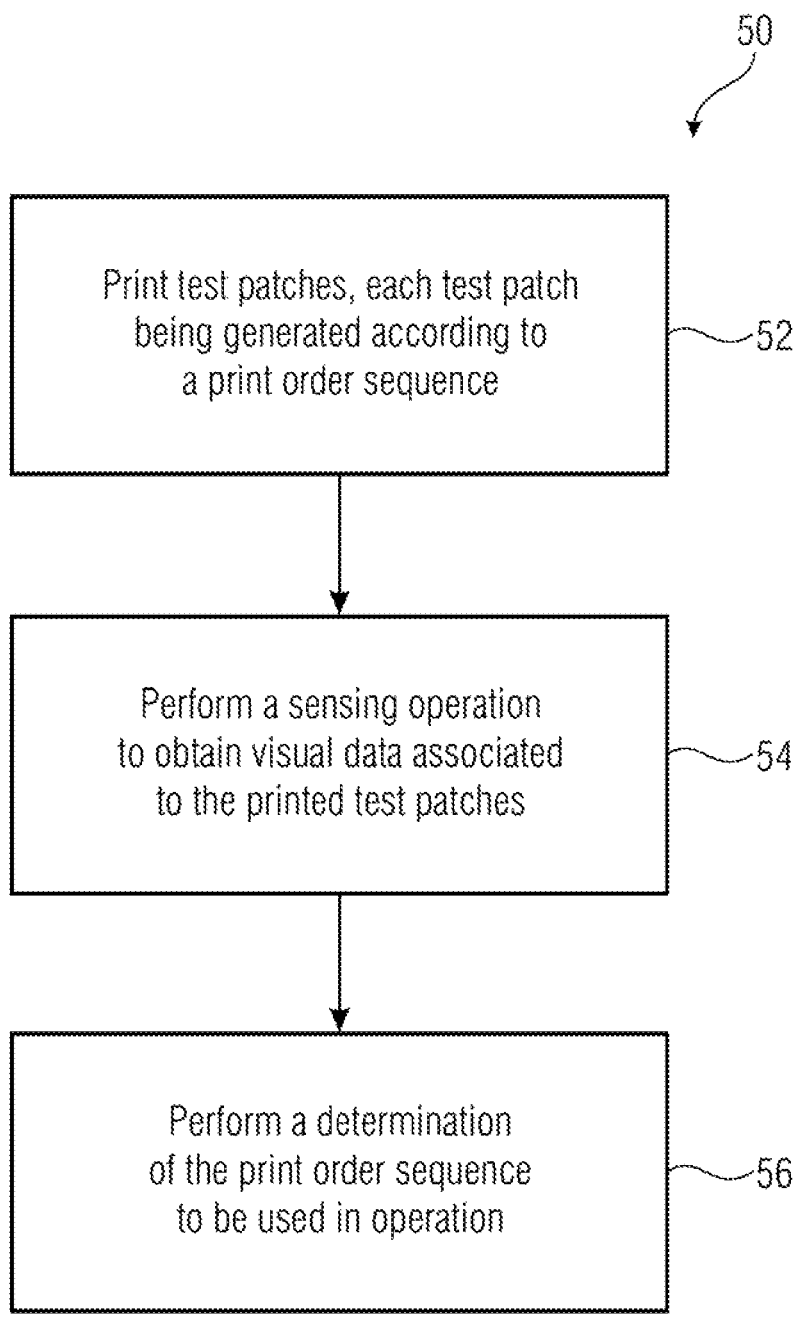
FIG. 5 is a schematic diagram showing a method according to an example.
Figure 6:
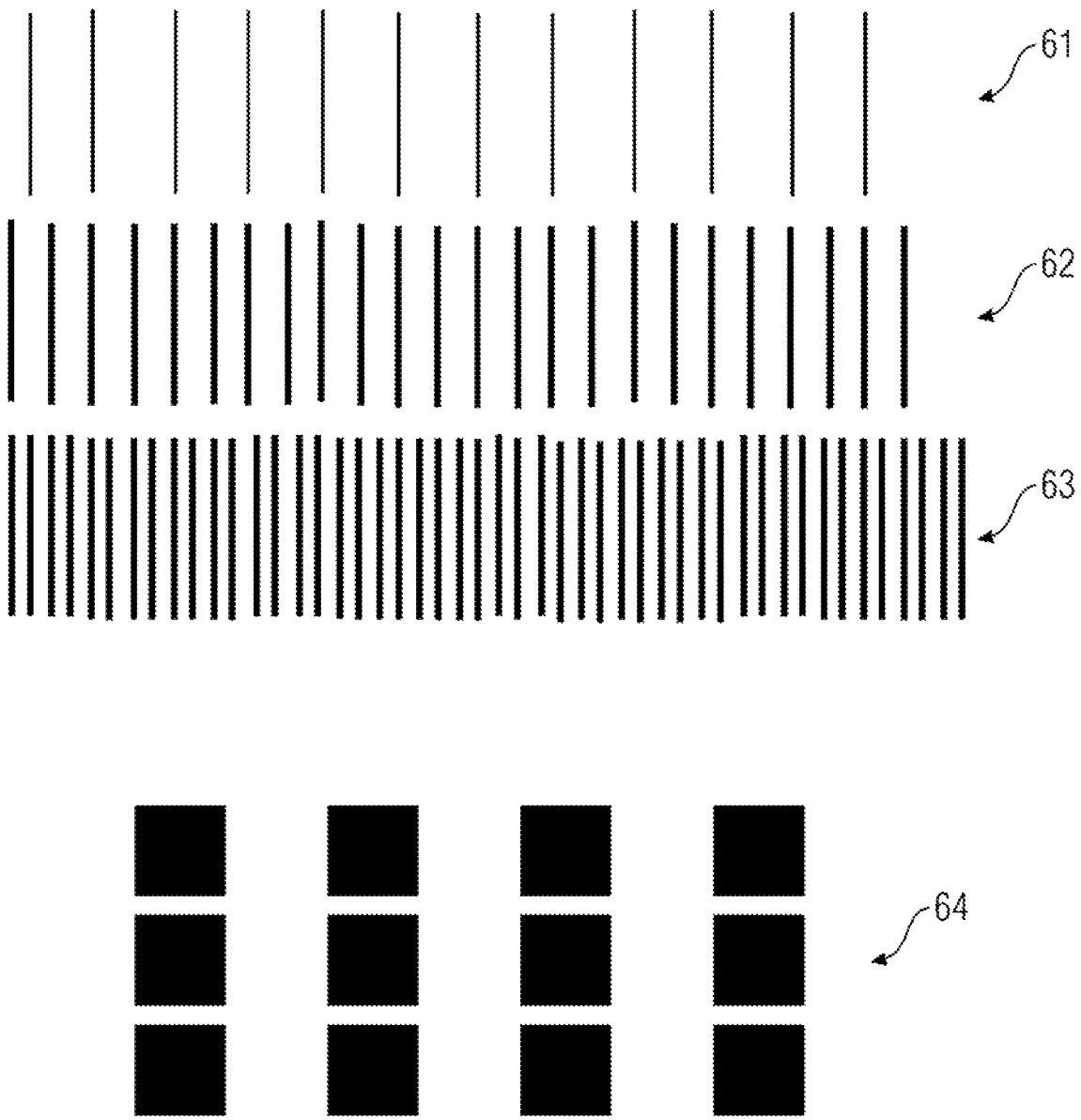
FIG. 6 shows different patches generated on a substrate according to an example.

FIG. 5 shows a method 50. The method 50 may be performed upstream to method 10, or, in some examples, as a part of block 12. At block 52, a plurality of test patches may be printed, using the printer whose sequence of print orders has to be defined. Each test patch may be printed according to a particular sequence of different orders. FIG. 6 shows some test patches which may be printed. Vertical lines 61 may have a thickness of two pixels: as in FIG. 3(c), the order for generating the left pixels of each line 61 is different from the order used for generating the right pixels. Each vertical line 61 is printed using a different sequence of printing orders. Vertical lines 62 may have a thickness of three pixel: while the left pixels of each line are generated according to a first printing order, the central pixels are generated according to a second order, and the right pixels are generated according to a third order. The printing orders of different vertical lines 62 are different. Vertical lines 63 may have a thickness of four pixel: each is printed using a sequence of orders which is different from those used for other vertical lines 63. In addition or alternative to vertical lines, it is also possible to use rectangles 64 (which may be squares) or other surfaces. For each rectangle 64, a first portion is generated using a first printing order, a second portion is generated using a second order, and so on.

At block 54, data associated to the visual appearance of the test patches 61-64 may be acquired, for example, using a sensing element. For example, optical density may be measured, e.g., using a spectrophotometer which measures the optical density of each single test patch (or using another instrument which permits to acquire, infer or calculate optical densities). In addition or alternative, an image of the test patches 61-64 may be acquired, e.g., as a matrix of different pixels.

At block 56, a sequence of print orders to be used in operation, may be determined. The sequence to be used in operation may be obtained, for example, by analyzing the data associated to the visual appearance obtained at block 54. For example, visual data associated to the patches 61-64 may be ranked. In order to rank the test patches, criteria such as the optical density measured for each test patch, the presence of satellites or holes, the measured thickness of areas of text test patches, or a combination of such criteria may be analyzed. These criteria, which are quality-related criteria, permit to select, among several print order sequences that may be used, the one which provides the best quality. For example, the best quality may be understood as the absence (or the greatest reduction) of the number of satellites or holes. According to another criterion, the best quality patch may be understood as the patch with lowest optical density. According to another criterion, the best quality patch may be understood as the patch with smallest thickness or area. Using at least one of these criteria, or a combination of some of these criteria, it is possible to determine the highest-ranking test patch 61-64 to be chosen as the appropriated sequence for performing print jobs.

Figure 7:
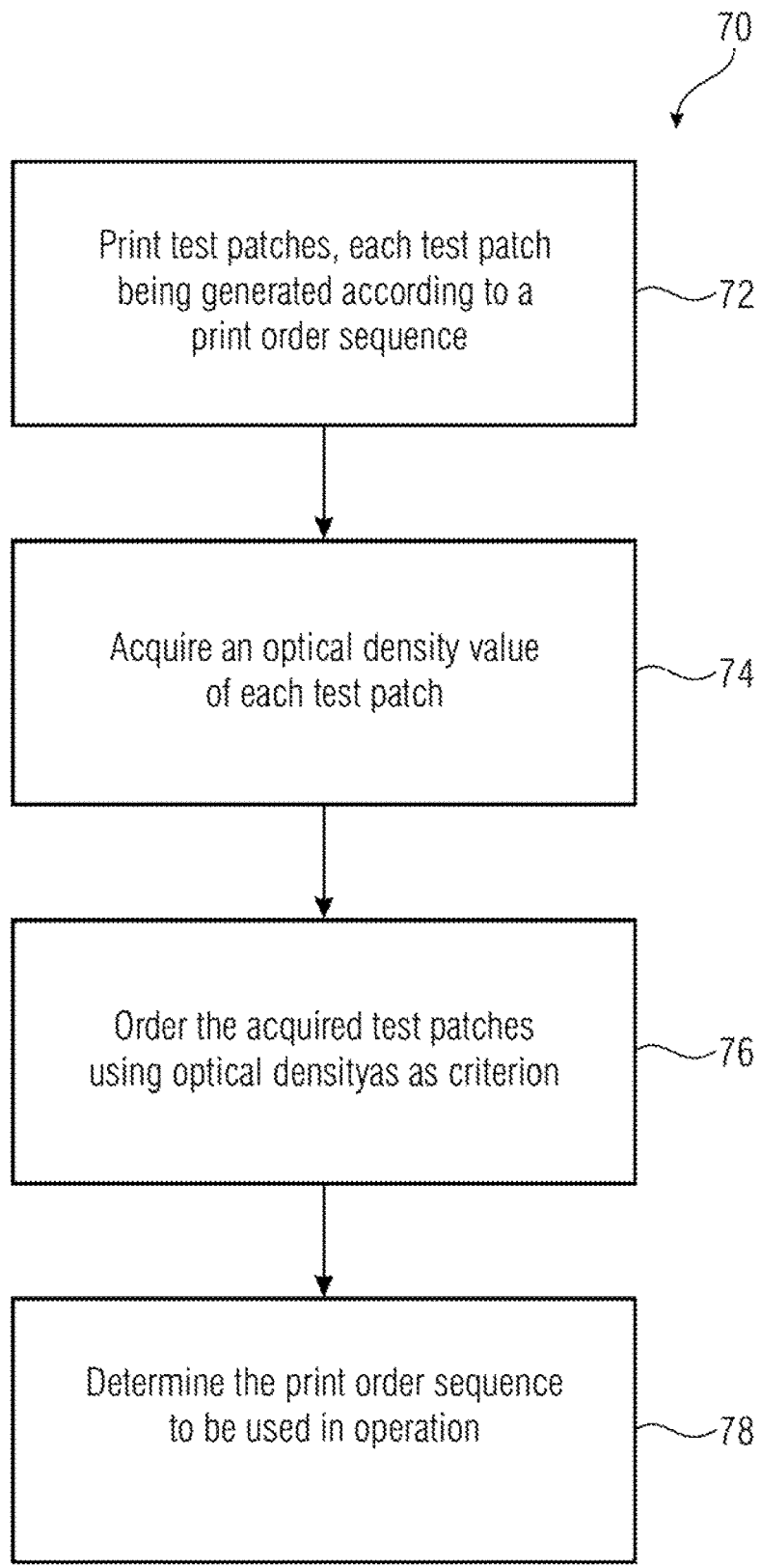
FIGS. 7, 8(*a*), and 8(*b*) am schematic diagrams showing methods according to examples.

FIG. 7 shows a method 70 which may be a particular case of the method 50. A first block 72 may be the same of the block 52, in which test patches 61-64 are generated according to different sequences of orders. A second block 74 may be a particular case of the block 54: a sensing operation is performed, e.g., using a spectrophotometer, to acquire optical density values of different test patches. Blocks 76 and 78 may constitute a particular case of block 56. In particular, at block 76 the optical densities of the test patches are compared. At block 78, the sequence of print orders to be used in operation is determined by ranking the test patches according to a criterion such as the optical density. According to this criterion, a patch with lower optical density may be ranked higher than a patch with greater optical density. By choosing, for example, the patch with lowest optical density, it is possible to determine the sequence which provides the best quality among the test patches.

Figure 8A:
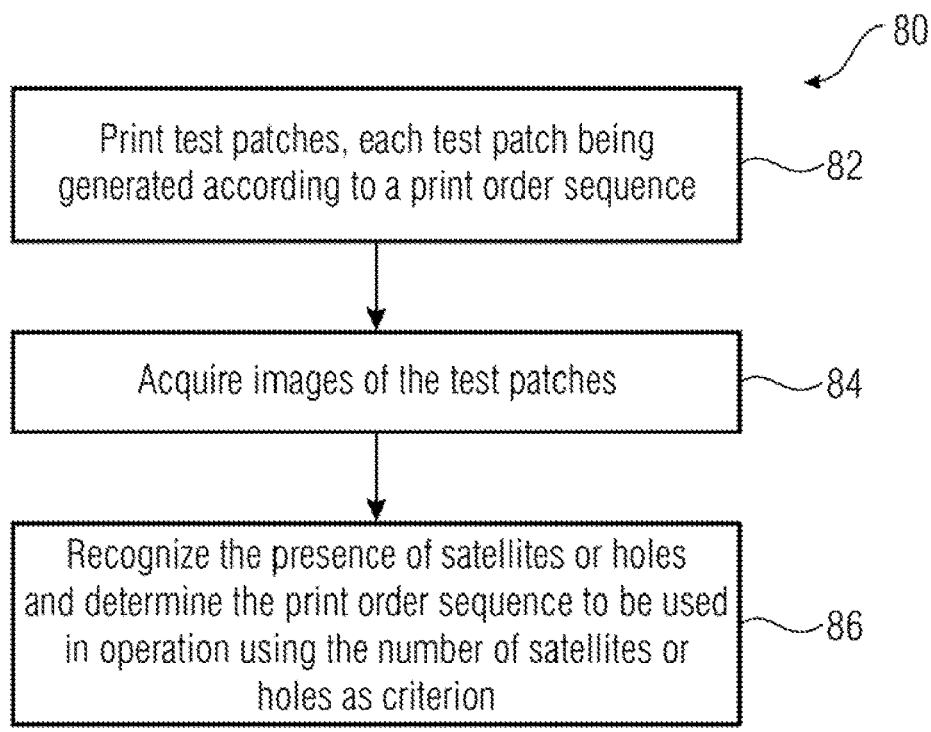

FIG. 8(a) shows a method 80 which may be a particular case of the method 50. A first block 82 may be the same of the block 82, in which test patches 61-64 are generated according to different sequences of orders. A second block 84 may be a particular instantiation of the block 54: a sensing operation is performed, e.g., using an image acquisition unit (e.g., a scanner), to obtain a representation of each patch (acquired patch) as a matrix of pixels (e.g., a bitmap). At block 86, the presence of satellites may be analyzed, e.g., by retrieving non-blank pixels (or groups of adjacent pixels) which are separated from the rest of the patch. Additionally or in alternative, the presence of holes in the patches may be analyzed, e.g., by retrieving blank portions within the patches. Accordingly, it is possible to rank different patches using the number of holes or satellites as a criterion. Patches having less holes or satellites may be ranked higher than patches having more holes or satellites. Patches without holes or satellites may be understood as having a quality which is better than the quality of patches with holes or satellites. Accordingly, the sequence of orders to be used in operation may be identified as the sequence associated to the test patch having the highest ranking in terms of number of holes or satellites. By choosing, for example, the patch with lowest thickness or area, it is possible to determine the sequence which provides the best quality among the test patches.

Figure 8B:
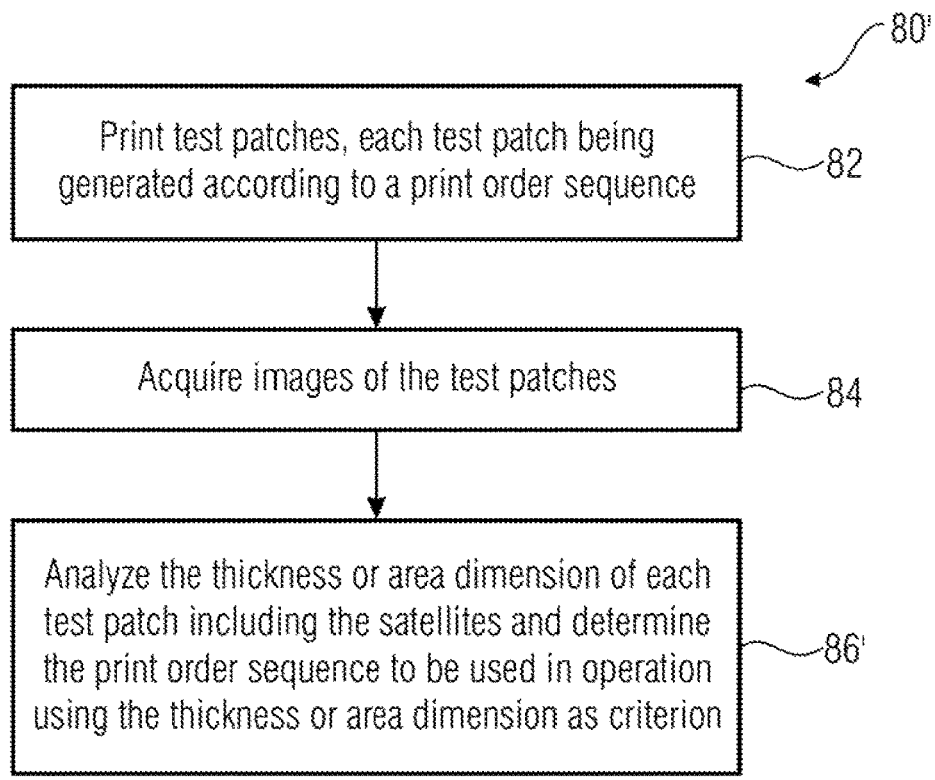

FIG. 8(b) shows a method 80' which may be a particular case of the method 50. Blocks 82 and 84 may be as in method 80. At block 86', for each acquired patch the thickness of or area occupied by each acquired patch (including the satellites of the patch) may be determined. Satellites which are very distant from the other parts of the patches increase the thickness of the patch and the area occupied by the patch. For that reason, the acquired patches with smaller thickness and/or area are assumed to have an increased quality. Accordingly, it is possible to rank the patches using the thickness or area of the test patches (including the satellites) as criterion. Patches having less greater thickness or area may be ranked higher than patches having smaller thickness or area. For example, it is possible to determine, as the print order sequence to be used in operation, the sequence used to generate the patch with smallest thickness or area.

In some examples, the thickness or area of the acquired patches may be weighted on the basis of the thickness of the original patch. For example, the area or thickness may be divided by the number of pixels of the original patches (e.g., two pixels for patches 61; three for patches 62, four for patches 63, and so on).

Figure 9:
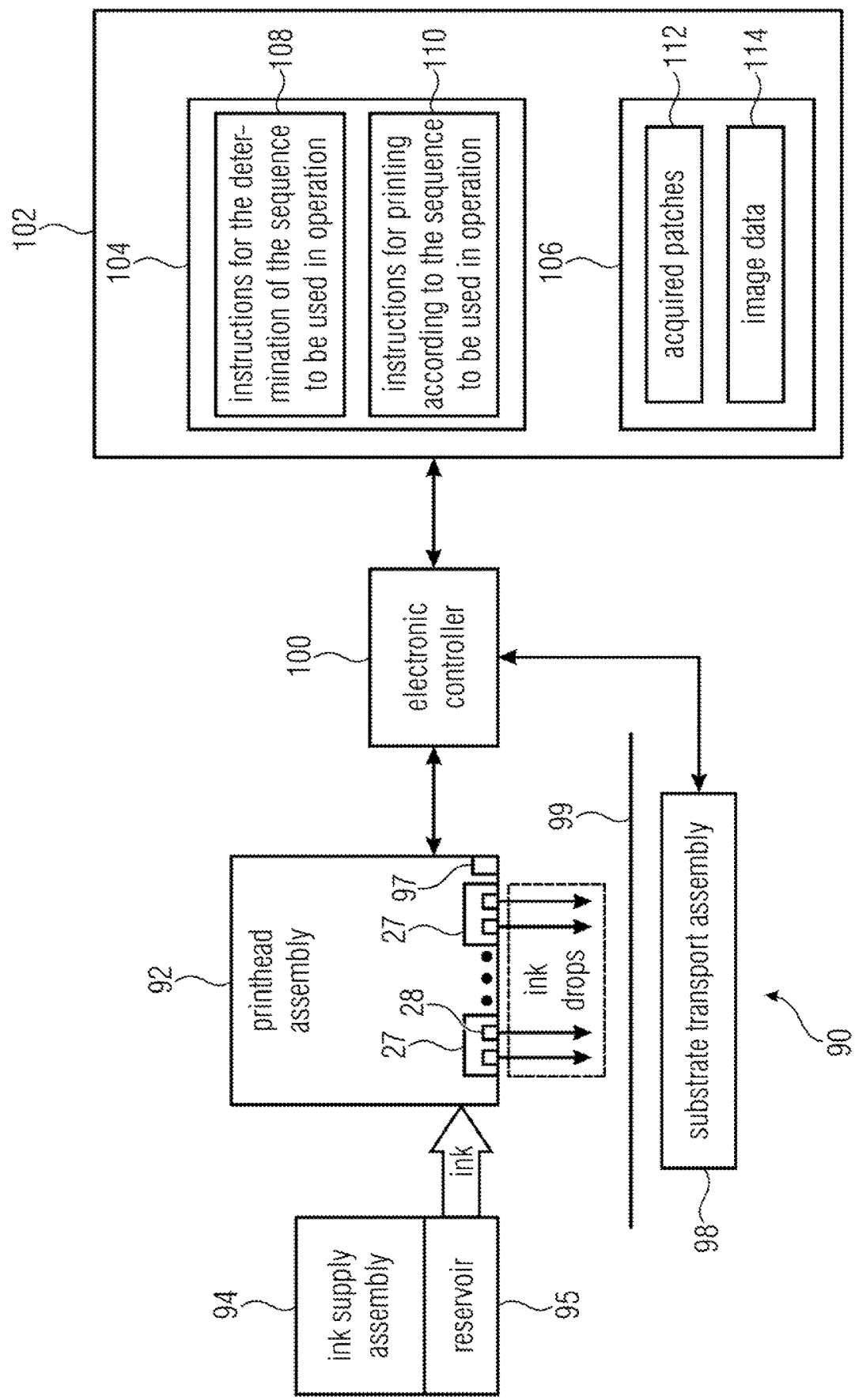
FIG. 9. shows an example of an inkjet printing system for performing a print job on a substrate.

FIG. 9 shows an inkjet printing system 90 (e.g., a TIJ) for performing a print job on a substrate 99. The inkjet printing system 90 may be an example of the system 20. The inkjet printing system 90 may include an inkjet printhead assembly 92. The inkjet printing system 90 may include an ink supply assembly 94. A reservoir 95 may be coupled to the ink supply assembly 94. The reservoir 95 may provide ink to the printhead assembly 92. The inkjet printing system 90 may include a transport assembly 98, which may provide a relative motion between the inkjet printhead assembly 92 and the substrate 99.

The inkjet printhead assembly 92 may comprise printhead dies 27. Each printhead die 27 may be, for example, the same of the printhead die of the system 20 and may comprise nozzles 28 organized according to a layout as discussed above.

The printhead assembly 92 may comprise a visual data sensor 97, which may be, for example, a spectrophotometer or a sensor capable of acquiring an image (e.g., scanner).

The inkjet printing system 90 may include an electronic controller 100. The controller 100 may control the execution of a print on the substrate 99. The controller 100 may control the substrate transport assembly 98 which controls the relative motion between the substrate 99 and the printhead assembly 92. The controller 100 may control the execution of at least one of the blocks of methods 10, 50, 70, 80 and 80'.

A memory unit 102 may be provided. The memory unit 102 may be accessed by the electronic controller 100. The memory unit 102 may comprise a non-transitory storage unit 104 (e.g., read-only memory, ROM or another type of non-transitory storage unit) and a transitory storage unit 106 (e.g., random access memory, RAM, a flash memory, or other types of memory or data registers).

The non-transitory storage unit 104 may store instructions 108 which, when executed by the a processor (e.g., the electronic controller 102) may cause the processor to perform a determination of the sequence of print orders for printing different print elements (e.g., vertical lines of pixels). For example, the instructions 104 may cause the inkjet printing system 90 to print patches such as the patches 61-64, to acquire visual data associated to the patches (e.g., acquired by the visual data sensor 97), and to determine the sequence of print orders (e.g., the sequence that has been used to generate the highest-quality patch), to be used in subsequent procedures, e.g., when generating print jobs.

The non-transitory storage unit 104 may store instructions 110 which permit to perform print jobs using the sequence identified while executing the instructions 108. By executing the instructions 110, for example, it is possible to generate different print elements using different orders and to obtain patterns such as the pattern 30c.

The transitory storage unit 106 may comprise memory space which is managed by the electronic controller 100. The transitory storage unit 106 may store bitmaps of patches 112 acquired by the sensor 97 while executing the instructions 108. By comparing the different bitmaps of patches 112 as acquired by the sensor 97 with each other and/or with the original bitmaps of the patches, it is possible to determine the quality of the patches and to determine the sequence of orders for the print system 90 to be used in operation.

The transitory storage unit 106 may store bitmaps of image data 114, which are images to be printed in the normal operations of the printer, e.g., while executing the instructions 110.

For printers which may apply several layers of printing material or different types of printing material (e.g., color printers using a plurality of colorants), the passages, operations, instructions and blocks above are performed for each material (e.g., each ink). Accordingly, a sequence of print orders is generated for each colorant.

Depending on certain implementation requirements, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a FLASH memory, having electronically readable control signals stored thereon, which cooperate (or are capable of cooperating) with a programmable computer system such that the respective method is performed. Therefore, the digital storage medium may be computer readable.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier. In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above described examples are illustrative for the principles discussed above. It is understood that modifications and variations of the arrangements and the details described herein will be apparent. It is the intent, therefore, to be limited by the scope of the impending patent claims and not by the specific details presented by way of description and explanation of the examples herein.

The invention claimed is:

1. A method comprising:
   printing test patches with a printhead comprising nozzles, each test patch being generated according to a different sequence of print orders defining a repeating pattern of printing material ejected from the nozzles to form different lines of pixels, wherein each test patch uses different repeating patterns of ejected printing material to form the different lines of pixels;
   performing a sensing operation to obtain visual data associated to the test patches;
   performing a determination of the sequence of print orders by comparing the visual data;
   selecting a sequence of print orders to be associated to print elements to be generated by ejecting printing material from the nozzles of the printhead based on the determination of the sequence of print orders used in the test patches; and
   controlling the generation of the print elements by ejecting printing material from the nozzles according to the selected sequence.

2. The method of claim 1,
   wherein performing the sensing operation comprises acquiring an optical density value of each test patch,
   wherein performing the determination comprises determining test patches with reduced optical density.

3. The method of claim 1,
   wherein performing the sensing operation comprises acquiring images of the test patches,
   wherein performing the determination comprises recognizing the presence of satellites or holes and ranking the test patches using the number of satellites or holes as criterion, a satellite being a print element formed by a misplaced drop that is detached from a main printed portion of a test patch; and a hole being an absence of a print element in the main printed portion of a test patch where a print element should have been placed.

4. The method of claim 1,
   wherein performing the sensing operation comprises acquiring images of the test patches,
   wherein performing the determination comprises analyzing the thickness or area dimension of each test patch and ranking the test patches using the thickness or area dimension as criterion.

5. A system comprising:
   a printhead die with a plurality of nozzles;
   a drop ejection actuation unit to define, at a given time instant, the nozzles from which printing material is to be ejected;
   an order defining unit to define a print order according to which drops are to be ejected from the nozzles; and
   a sequence defining unit to:
      print test patches with the printhead, each test patch being generated according to different repeating patterns of printing material ejected from the nozzles to form different lines of pixels, wherein each test patch uses different repeating patterns of ejected printing material to form the different lines of pixels; and
      determine a sequence of print orders based on the test patches, the sequence determined by the sequence defining unit in order to adjust for one of: lack of synchronization between a printhead firing control and relative motion of the printhead and a substrate receiving the printing material, and error in a value used for a distance between the printhead and the substrate.

6. The system of claim 5, further comprising
   a sensor to provide visual data of the test patches generated on a substrate,
   wherein the system is to determine the sequence of print orders on the basis of the visual data.

7. The system of claim 6,
   wherein the sensor is a spectrophotometer to acquire optical density values,
   wherein the system is to determine visual data associated to the test patches with reduced optical density to determine the sequence of printing orders.

8. The system of claim 6,
   wherein the sensor is to acquire images,
   wherein the system is to determine quality data associated to the test patches to determine the sequence of printing orders.

9. The system of claim 6,
wherein the sensor is to acquire images,
wherein the system is to recognize the presence of satellites or holes to determine the sequence of printing orders, a satellite being a misplaced drop that is detached from a main printed portion of a patch; and a hole being an absence of a drop in the main printed portion of the patch where a drop should have been placed.

10. The system of claim 9,
wherein the sensor is to acquire images,
wherein the system is to compare the thickness or area dimension of each acquired test patch, to determine the sequence of print orders.

11. A non-transitory processor readable storage medium comprising instructions that, when executed by the processor, cause the processor to:
print test patches with a printhead comprising nozzles, each test patch being generated according to different repeating patterns of printing material ejected from the nozzles to form different adjacent lines of pixels, wherein each test patch uses different repeating patterns of ejected printing material to form the different adjacent lines of pixels;
determine a sequence of print orders to be used to perform print jobs on the basis of acquired visual data associated to the test patches generated by the nozzles, the sequence of print orders determined so as to compensate for irregular spacing between nozzles of a printhead used to generate the test patches; and
perform a print job by sequentially modifying the nozzle-ejection order for generating different print elements according to the sequence.

12. The non-transitory processor readable storage medium of claim 11, further comprising instructions that, when executed by the processor, cause the processor to:
compare the visual data associated to the acquired patches to determine the sequence of different print orders.

13. The non-transitory processor readable storage medium of claim 11, further comprising instructions that, when executed by the processor, cause the processor to:
analyze quality-related values of the acquired patches to determine the sequence of different print orders.

14. The non-transitory processor readable storage medium of claim 13, further comprising instructions that, when executed by the processor, cause the processor to:
rank between the patches on the basis of the quality-related values.

15. The method of claim 1, wherein an error caused by the printing system is an error caused by an incorrect value for the distance between the printhead and a substrate receiving the ejected printing material.

16. The method of claim 4, wherein a best quality test patch is a patch with the smallest thickness or area dimension.

17. The method of claim 1, wherein comparing the visual data comprises comparing sensed bitmaps of the test patches to each other or with original bitmaps of the test patches.

18. The method of claim 1, wherein each test patch comprises a first line of pixels formed by a first repeating pattern of ejected printing material and a second line of pixels formed by a second repeating pattern of ejected printing material.

19. The method of claim 1, wherein the line of pixels comprise vertical lines of pixels that are orthogonal to a horizontal scanning direction of the printhead.

20. The method of claim 1, wherein the different sequence of print orders comprise patterns of ejected printing material ejected that repeat based on primitive groups of nozzles.

* * * * *